Patented Feb. 4, 1941

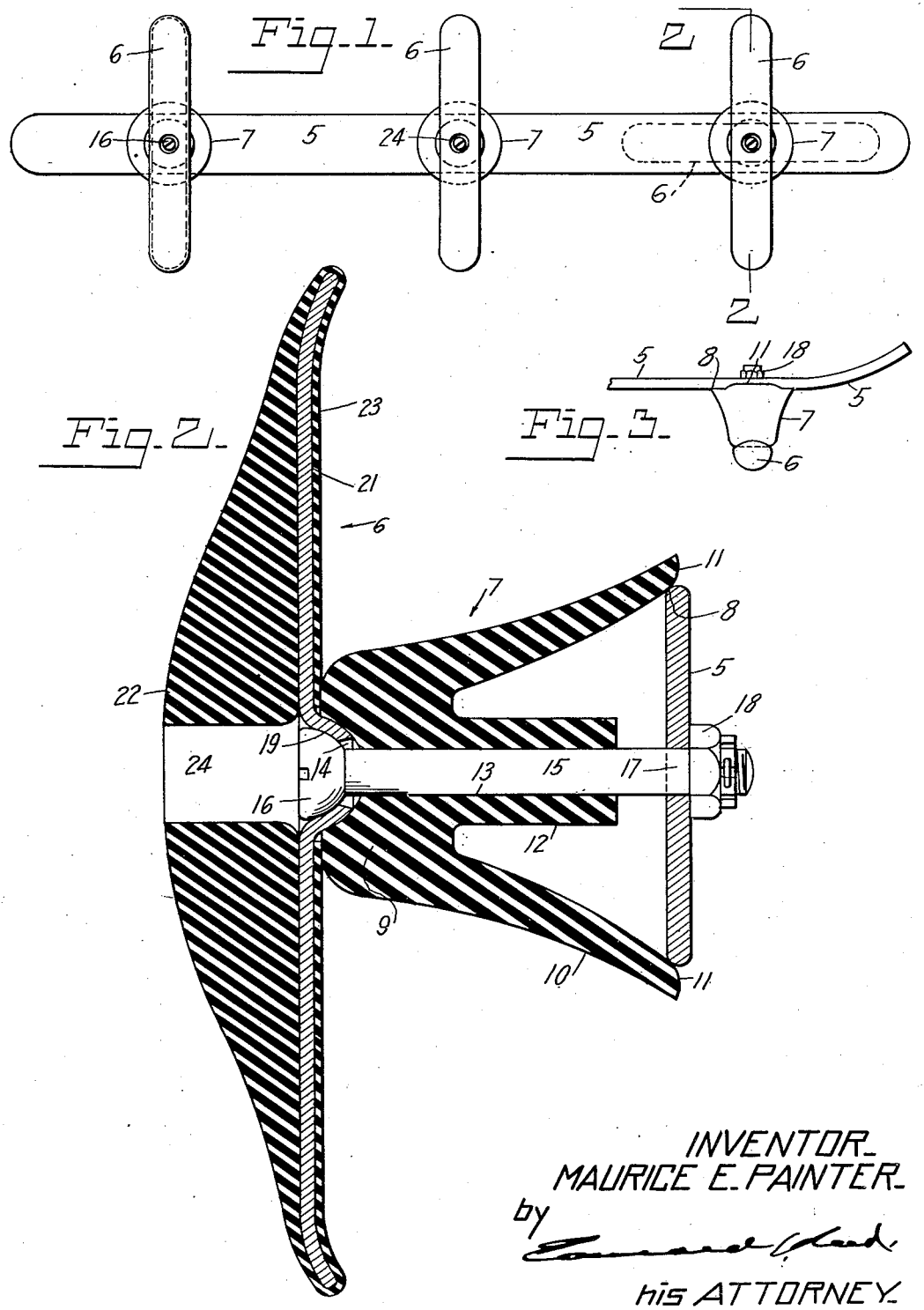

2,230,333

UNITED STATES PATENT OFFICE

2,230,333

CUSHIONING DEVICE FOR AN AUTOMOBILE BUMPER

Maurice E. Painter, Brookville, Ohio

Application May 26, 1939, Serial No. 275,939

27 Claims. (Cl. 293—55)

This invention relates to a cushioning device for an automobile bumper and one object of the invention is to minimize the shock to which the bumper and automobile are subjected when the bumper contacts with another automobile or other object.

A further object of the invention is to provide a cushioning device to be secured to the outer side of the bumper and of such a character and shape that it will strongly resist the force of the impact but will yield in proportion to the force of that impact.

A further object of the invention is to provide such a cushioning device comprising a guard arm to be mounted on the bumper for limited movement toward and from the same and a yieldable element interposed between the guard arm and the bumper to resist such movement.

A further object of the invention is to provide a yieldable element of such a character that it will have the desired yieldability but will not be liable to be injured by heavy impacts and which can be produced at a low cost.

A further object of the invention is to provide such a cushioning device in which the guard arm may have a limited tilting movement with relation to the yieldable element.

A further object of the invention is to provide such a device in which the guard arm will be mounted so that in event the guard is hooked over the bumper of another automobile it can be easily disengaged therefrom.

A further object of the invention is to provide such a cushioning device in which the guard arm will be provided on its outer side with a relatively soft cushion, in addition to the yieldable element which is interposed between the same and the bumper.

Other objects of the invention may appear as the device is described in detail.

In the accompanying drawing Fig. 1 is a front elevation of a conventional bumper having a plurality of my cushioning devices mounted thereon; Fig. 2 is a sectional view taken through the cushioning device on the line 2—2 of Fig. 1, on a larger scale; and Fig. 3 is a plan view of a portion of the bumper with the cushioning device attached thereto.

In the drawing I have illustrated one embodiment of my invention and in Fig. 1 have shown three of the devices mounted on a conventional bumper 5. It will be understood that any suitable number of the cushioning devices may be applied to a single bumper and that the device itself may take various forms without departing from the spirit of the invention.

In that form of the invention here illustrated the cushioning device comprises a guard arm, indicated as a whole by the reference numeral 6, supported on the bumper 5 for movement toward and from the same, and a yieldable cushioning element 7 interposed between the guard arm and the bumper. It has been proposed heretofore to provide a bumper with cushioning devices but so far as I have been informed these devices have been in the nature of metal springs or pneumatic devices, usually in annular form similar to a tire but of small diameter. These devices, however, have not been entirely satisfactory and when they are of such a character as to provide the desired yieldability they are liable to breakage or injury under severe or repeated impacts, and the pneumatic devices are unsightly. Therefore I have provided a yieldable element of such a character and material that it has the desired yieldability but will not be injured by severe or repeated impacts and, further, this yieldable element can be produced at a relatively low cost.

In the form here shown the yieldable element comprises a hollow body of yieldable material, preferably a rather stiff rubber composition having sufficient flexibility for the purpose. This hollow body has an open end arranged to engage the outer surface of the bumper, as shown at 8. Preferably the yieldable element is closed at its other end by a transverse wall 9 which imparts thereto substantially a cup-shape. The circumferential wall 10 is flared toward its open end to facilitate the flexing thereof under pressure. This open end is of such a size that it will contact the bumper across substantially the full width of the latter and it may be of such a diameter that the upper and lower portions thereof will project above and below the bumper, thus facilitating the deformation of the yieldable element under pressure, and the upper and lower portions being then projected above and below the bumper and the intermediate portions being distorted laterally. Further, the circumferential wall preferably decreases in thickness from the closed end or transverse wall 9 toward the open end thereof and the inner corner of the wall at the open end is rounded, as shown at 11, to permit it to slide freely on the bumper. The yieldable element is also provided with means for limiting the movement of the outer or closed end portion thereof toward the bumper, this means being here shown as comprising a boss 12 arranged within the hollow yieldable element and extending from the transverse wall 9 to a point adjacent to but spaced from the bumper. This boss has some yieldability so that it does not constitute a rigid stop.

The yieldable element is supported in contact with the bumper by means of a plate in contact with the outer or closed end thereof, this plate being here shown as comprising a guard arm 6 which extends above and below the respective edges of the bumper. This guard arm is so supported on the bumper that it may have movement toward the same, under the force of an impact, and that it may be drawn toward the bumper so as to confine the yieldable element 7 under pressure between the guard arm and the bumper. For this purpose the yieldable element is provided with an opening 13 extending through the transverse wall 9 and boss 12 thereof and the guard arm is provided with an opening 14 in line with the opening 13. An attaching device, such as a bolt 15, extends through these openings and is provided at its outer end with a head 16 which engages the guard arm about the opening 14 and has its inner end, adjacent to the open end of the yieldable element, smooth and adapted to be slidably mounted in the bumper 5, as shown at 17. A nut 18 applied to the bolt on the inner side of the bumper limits the outward movement of the guard arm and provides means whereby the guard arm may be caused to exert pressure on the yieldable element when the parts are in their normal positions. As shown in Fig. 2 this pressure has slightly distorted the open end portion of the yieldable element so that the upper or lower parts thereof project for some distance across the respective edges of the bumper.

By mounting the guard arm on the attaching bolt, as above described, it is possible to move the same about the axis of the bolt but the pressure of the yieldable device on the inner face of the guard arm tends to hold the same normally in its upright position. It not infrequently happens in traffic that the guard arm of a bumper on one automobile will override and become hooked to a bumper on another automobile and difficulty is then experienced in disengaging the bumpers. Due to the pivotal mounting of the present guard arm it can be disengaged from the bumper over which it is hooked by merely rotating the same about its axis. It is of course spaced some distance from the bumper and can, if necessary, be moved to a horizontal position, as shown in dotted lines in Fig. 1. It is also desirable that the guard arm should be capable of a limited tilting movement about an axis extending lengthwise of the bumper so as to permit the same to yield somewhat if the point of impact is above or below the yieldable element 7. To permit of such a movement the guard arm is provided in its front surface with a semi-spherical bearing 19 extending about the opening 14, and the bolt head 16 is also semi-spherical so as to form in effect a ball and socket joint between the bolt and the guard arm. When the bolt 15 is tightened down to place the yieldable element under pressure the inwardly extending portion of the bearing 19 will be pressed into the yieldable element so that the latter contacts with the guard arm above and below the bearing portion thereof and thus holds the guard arm normally in a substantially vertical position.

I have also provided the guard arm on its front surface with a cushion of substantial thickness and having substantially greater yieldability than has the yieldable element 7. As a result the cushion on the guard arm will absorb a portion of the shock to which the device is subjected and will absorb all of that shock when the latter is not sufficient to deform the relatively stiff yieldable element. This cushion may take various forms but in the construction here shown the guard arm comprises a flat metal bar 21, in which the bearing 19 is formed, and a pad 22 of soft rubber secured to the front surface of this body. Preferably the whole metal body of the guard arm is enveloped in rubber and the latter vulcanized to the metal. When this is done a relatively thin layer of rubber is applied to the inner side of the body, as shown at 23, and to the edges thereof and the pad on the front of the body increases gradually in thickness from the upper and lower ends of the guard arm toward the center thereof, where it is of a thickness much greater than the thickness of the body. This pad is preferably provided with an opening 24 in line with the bolt 15 to enable the latter to be readily inserted and held against rotation while the nut 18 is being tightened down.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. A cushioning device for an automobile bumper comprising an element of yieldable material having one end provided with a relatively wide recess and adapted to engage the outer surface of the bumper and having its other end closed, a substantially rigid plate engaging the closed end of said element, and means for securing said plate to said bumper and confining said element between said plate and said bumper.

2. A cushioning device for an automobile bumper comprising a guard member adapted to be mounted on the bumper and to extend beyond at least one edge thereof, an element of yieldable material having one end provided with a relatively wide recess and adapted to engage said bumper, and means for securing said guard member to the other end of said element and to said bumper for movement toward and from the latter.

3. A cushioning device for an automobile bumper comprising an element of yieldable material having one end provided with a relatively wide recess and adapted to engage the bumper, a guard member extending across the other end of said element, and an attaching device extending through said guard member and said element and having means for so securing the same to said bumper that said guard member may have movement toward and from said bumper.

4. A cushioning device for an automobile bumper comprising an element of yieldable material having one end provided with a relatively wide recess and adapted to engage said bumper, having a circumferential wall flared toward said recessed end and having a transverse wall at its other end, a guard member extending across said transverse wall, and an attaching device extending through said guard member and said transverse wall and having means adjacent the recessed end of said hollow element for movably connecting said guard member with said bumper.

5. A cushioning device for an automobile bumper comprising an element of yieldable material having one end provided with a relatively wide recess and adapted to engage the bumper, a guard member extending across the other end of said element, an attaching device extending through said guard member and said element and having means for so securing the same to said bumper that said guard member may have movement toward and from said bumper, and means within said recess to limit the movement of said guard member toward said bumper.

6. A cushioning device for an automobile bumper comprising an element of yieldable material having one end provided with a relatively wide recess and adapted to engage the bumper, having a circumferential wall flared toward said recessed end and having a transverse wall at its other end, a guard member extending across said transverse wall, said guard member and said transverse wall having alined openings, and a bolt extending through said openings and having that portion thereof adjacent said recessed end of said yieldable element adapted to be slidably mounted in said bumper, said bolt having means to limit its outward movement with relation to said bumper.

7. A cushioning device for an automobile bumper comprising a guard arm, means for mounting said guard arm on said bumper for bodily movement toward and from the same and for movement about an axis transverse to said bumper, and a yieldable element arranged to be confined between said guard arm and said bumper to resist the movement of said guard arm toward said bumper and to yieldably retain said guard arm in a position transverse to said bumper.

8. A cushioning device for an automobile bumper comprising an element of yieldable material having one end provided with a relatively wide recess and adapted to engage the bumper, a guard member extending across the other end of said element, an attaching device extending through said guard member and said element and having means for movably connecting the same with said bumper and for supporting said guard member for movement about an axis transverse to said bumper.

9. A cushioning device for an automobile bumper comprising an element of yieldable material having one end provided with a relatively wide recess and adapted to engage the bumper, a guard member extending across the other end of said element, an attaching device extending through said guard member and said element and having means for movably connecting the same with said bumper and for supporting said guard member for movement about an axis transverse to said bumper and about an axis extending lengthwise of said bumper.

10. A cushioning device for an automobile bumper comprising an element of yieldable material having one end adapted to engage said bumper, a guard arm extending across the other end of said element and having an opening surrounded by a semi-spherical bearing surface in that side thereof opposite said element, an attaching device extending through said opening and said element and having a semi-spherical head engaging said bearing and having means for securing said guard arm to said bumper for movement with relation thereto and for confining said yieldable element under pressure between said guard arm and said bumper.

11. A cushioning device for an automobile bumper comprising an element of yieldable material, having one end adapted to engage said bumper, a guard arm extending across the other end of said element and having an opening surrounded by a semi-spherical bearing surface in that side thereof opposite said element, an attaching device extending through said opening and said element and having a semi-spherical head engaging said bearing and having means for securing said guard arm to said bumper for movement with relation thereto and for confining said yieldable element under pressure between said guard arm and said bumper, said guard arm having on its outer surface a pad of material having substantially greater yieldability than said hollow element.

12. A cushioning device for an automobile bumper comprising an element of yieldable material having one end adapted to engage the bumper, a guard member extending across the other end of said element, an attaching device extending through said guard member and said element and having means for so securing the same to said bumper that said guard member may have movement toward and from said bumper, said guard member comprising a substantially rigid body having on its outer side a relatively thick pad of yieldable material.

13. In a cushioning device for an automobile bumper, a yieldable element having one end adapted to engage the outer surface of said bumper and having an opening therethrough, a guard member extending across the other end of said yieldable element and provided with an opening in line with the opening in said yieldable element, and having a substantially semi-spherical bearing surface surrounding said opening, and a rigid attaching member extending through said yieldable element and said guard member, having at its outer end a substantially semi-spherical head engaging said bearing surface and having at its inner end means for mounting the same on said bumper.

14. In a cushioning device for an automobile bumper, a guard member, means for supporting said guard member on the outer side of said bumper for bodily movement from its normal position toward said bumper and for tilting movement about an axis extending lengthwise of said bumper, and a device acting on said guard member to hold the same normally against both movements, said device being yieldable to permit said guard member to have either or both of said movements under the force of an impact on that side thereof opposite said bumper.

15. In a cushioning device for an automobile bumper, a guard member, an attaching device for connecting said guard member with and on the outer side of said bumper for bodily movement from its normal position toward the latter, a yieldable element adapted to be interposed between said guard member and said bumper to resist the movement of said guard member toward said bumper, said attaching device having means for supporting said guard member for inward tilting movement from its normal position about an axis extending lengthwise of said bumper and said yieldable element being arranged to hold said guard member normally against such tilting movement and to yield under force of an impact on the outer side of said guard member and thus permit said guard member to tilt inwardly and to move bodily with relation to said bumper.

16. In a cushioning device for an automobile bumper, an upright guard member adapted to extend above and below said bumper, means connected with an intermediate portion of said guard member to support the same on the outer side of and in spaced relation to said bumper for bodily movement from its normal position toward the latter and for tilting movement in either direction about an axis extending lengthwise of said bumper, and a device yieldably engaging that side of said guard member adjacent said bumper to hold the same normally against bodily movement and against tilting movement in either direction about said axis.

17. In a cushioning device for an automobile bumper, a guard member, an attaching device having means for supporting said guard member on the outer side of said bumper for bodily movement from its normal position toward said bumper and having means cooperating with a part of said guard member to pivotally support the latter thereon for movement about an axis extending lengthwise of said bumper, and a resilient device adapted to be arranged between said bumper and said guard member to yieldably resist the movement of the latter by an impact on the outer face thereof.

18. In a cushioning device for an automobile bumper, a normally upright guard member, means for supporting said guard member on the outer side of said bumper for bodily movement from its normal position toward said bumper and for movement about a substantially horizontal axis extending transversely to said bumper, and yieldable means to hold said guard member normally against both of said movements.

19. In a cushioning device for an automobile bumper, a normally upright guard member, means for supporting said guard member on the outer side of said bumper for bodily movement from its normal position toward said bumper, for tilting movement about an axis extending lengthwise of said bumper and for pivotal movement about a substantially horizontal axis extending transversely to said bumper, and yieldable means to hold said guard member normally against all of said movements.

20. In a cushioning device for an automobile bumper, an attaching device having means for securing the same to said bumper with a part thereof extending outwardly from said bumper, a normally upright guard member mounted on the outer portion of said attaching device for bodily movement from its normal position toward said bumper and connected with said attaching device for movement about two substantially horizontal axes extending respectively lengthwise of and transversely to said bumper, and yieldable means to normally hold said guard member against movement with relation to said bumper.

21. In a cushioning device for an automobile bumper, a guard member, an attaching device having at one end means for supporting the same on said bumper and having at its other end means for supporting said guard member thereon for bodily movement from its normal position toward said bumper and for tilting movement toward said bumper by the force of an impact on the outer side of said guard member, and a resilient device adapted to be interposed between said bumper and said guard member and to act on said guard member on all sides of said attaching device to yieldably resist all movement of said guard member with relation to said bumper.

22. In a cushioning device for an automobile bumper, an attaching device having means for supporting the same on said bumper for fore and aft movement with relation thereto, a guard member mounted on the outer portion of said attaching device for bodily movement therewith, from its normal position toward said bumper for movement about an axis extending lengthwise of said bumper and for movement about a substantially horizontal axis transverse to said bumper, and means acting on said guard member to yieldably resist said movements of the latter.

23. In a cushioning device for an automobile bumper, a guard member, an elongate attaching device having means for slidably supporting the same on said bumper and having at its outer end means cooperating with a part of said guard member to support the latter thereon for bodily movement therewith and for pivotal movement with relation thereto, and an element formed of a yieldable but relatively stiff rubber composition mounted about said attaching device and confined under pressure between said bumper and said guard member to yieldably resist the movement of the latter with relation to said bumper.

24. In a cushioning device for an automobile bumper, a guard member, means for supporting said guard member on the outer side of said bumper for bodily movement from its normal position toward the latter and for pivotal movement with relation thereto, and an element formed of a yieldable but relatively stiff rubber composition and adapted to be confined under pressure between said bumper and said guard member to yieldably resist both movements of the latter and decreasing in width from one end thereof toward the other end thereof to facilitate the tilting movement of said guard member.

25. In a cushioning device for an automobile bumper, a guard member, an element formed of a yieldable but relatively stiff rubber composition having a wide inner end portion to engage said bumper and a relatively narrow outer end portion to engage said guard member and provided with an opening therethrough, and an attaching device connected at one end with said guard member, extending through the opening in said element and adapted to be connected at its other end with said bumper to support said guard member for bodily movement from its normal position toward said bumper.

26. In a cushioning device for an automobile bumper, a yieldable element having one end adapted to engage said bumper across substantially the full width of the latter, said element decreasing in diameter from one end thereof toward the other end thereof, a normally upright and substantially rigid guard member extending across and projecting beyond the outer end of said yieldable element, and means for connecting said guard member with said bumper for both bodily movement from its normal position toward said bumper and pivotal movement with relation to said bumper against the resistance of said yieldable element.

27. In a cushioning device for an automobile bumper, a yieldable element having one end adapted to engage the outer surface of said bumper and having an opening therethrough, a guard member extending across the other end of said yieldable element, and a rigid attaching member extending through the opening in said yieldable element and having its outer end connected with said guard member and having at its inner end means for connecting the same with said bumper, at least one of said connecting means being slidable to permit said guard member to move toward said bumper against the resistance of said yieldable element.

MAURICE E. PAINTER.